(12) United States Patent
Solheid et al.

(10) Patent No.: US 7,171,100 B2
(45) Date of Patent: Jan. 30, 2007

(54) OPTICAL FIBER SLACK STORAGE TRAY FOR DISTRIBUTION CABINET

(75) Inventors: James Solheid, Lakeville, MN (US); Matthew Holmberg, Le Center, MN (US); Soutsada Vongseng, Chanhassen, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 71 days.

(21) Appl. No.: 10/980,981

(22) Filed: Nov. 3, 2004

(65) Prior Publication Data

US 2006/0093302 A1    May 4, 2006

(51) Int. Cl.
*G02B 6/00* (2006.01)

(52) U.S. Cl. ...................... 385/135; 385/134

(58) Field of Classification Search ............... 385/134, 385/135

See application file for complete search history.

(56) References Cited

U.S. PATENT DOCUMENTS

| | | | |
|---|---|---|---|
| 4,765,709 A | 8/1988 | Suillerot et al. | 385/135 |
| 4,792,203 A * | 12/1988 | Nelson et al. | 385/135 |
| 4,798,432 A | 1/1989 | Becker et al. | 385/135 |
| 4,898,448 A | 2/1990 | Cooper | 385/92 |
| 5,069,523 A | 12/1991 | Finzel et al. | 385/135 |
| 5,093,885 A | 3/1992 | Anton | 385/134 |
| 5,115,489 A | 5/1992 | Norris | 385/135 |
| 5,131,066 A | 7/1992 | Foss | 385/135 |
| 5,189,724 A | 2/1993 | Hartley | 385/135 |
| 5,247,603 A | 9/1993 | Vidacovich et al. | 385/135 |
| 5,249,252 A | 9/1993 | Noto | 385/135 |
| 5,323,479 A | 6/1994 | Allen | 385/135 |
| 5,511,144 A | 4/1996 | Hawkins et al. | 385/135 |
| 5,519,804 A | 5/1996 | Burek et al. | 385/135 |
| 5,544,273 A | 8/1996 | Harrison | 385/135 |
| 5,553,186 A * | 9/1996 | Allen | 385/135 |
| 5,758,003 A | 5/1998 | Wheeler et al. | 385/134 |
| 5,768,463 A | 6/1998 | Foss et al. | 385/135 |
| 5,778,131 A | 7/1998 | Liewellyn et al. | 385/135 |
| 5,778,132 A * | 7/1998 | Csipkes et al. | 385/135 |
| 5,802,237 A | 9/1998 | Pulido | 385/135 |
| 6,215,938 B1 | 4/2001 | Reitmeier et al. | 385/135 |
| 6,263,141 B1 | 7/2001 | Smith | 385/135 |
| 6,496,638 B1 | 12/2002 | Andersen | |

(Continued)

FOREIGN PATENT DOCUMENTS

DE    27 21 300 A1    11/1978

(Continued)

OTHER PUBLICATIONS

"FL2000 Splice Panel Installation Instructions," *ADC Telecommunications, Inc.*, ADCP-90-224, Issue 5, pp. 1-12 (Jan. 1998).

(Continued)

*Primary Examiner*—Frank G. Font
*Assistant Examiner*—Derek L. Dupuis
(74) *Attorney, Agent, or Firm*—Merchant & Gould P.C.

(57) ABSTRACT

The present invention relates to a slack storage tray for managing slack associated with fiber terminations in a distribution cabinet. The storage tray includes a base defining a cable pathway for storing multiple loops of a cable. A hinged cover further defines a cable pathway for managing the cable.

17 Claims, 9 Drawing Sheets

U.S. PATENT DOCUMENTS

| | | |
|---|---|---|
| 6,591,051 B2 | 7/2003 | Solheid et al. .............. 385/134 |
| 6,625,374 B2 | 9/2003 | Holman et al. ............. 385/135 |
| RE38,311 E | 11/2003 | Wheeler ..................... 385/135 |
| 6,760,531 B1 | 7/2004 | Solheid et al. .............. 385/135 |
| 2002/0176681 A1 | 11/2002 | Puetz et al. ................. 385/134 |
| 2003/0095772 A1 | 5/2003 | Solheid et al. ............. 385/134 |
| 2003/0174996 A1 | 9/2003 | Henschel et al. ........... 385/135 |
| 2004/0013389 A1 | 1/2004 | Taylor |
| 2004/0074852 A1 | 4/2004 | Knudsen et al. .............. 211/26 |
| 2004/0175090 A1* | 9/2004 | Vastmans et al. ........... 385/135 |

FOREIGN PATENT DOCUMENTS

| | | |
|---|---|---|
| EP | 0 871 047 A1 | 10/1998 |
| FR | 2 579 330 | 9/1986 |
| WO | WO 95/07480 | 3/1995 |
| WO | WO 96/10203 | 4/1996 |
| WO | WO 96/19745 | 6/1996 |
| WO | WO 00/58769 | 10/2000 |
| WO | WO 02/082152 A1 | 10/2002 |

OTHER PUBLICATIONS

"FlexLight 2000™ System Planning and Application Guide," *ADC Telecommunications, Inc.*, ADCP-90-209, 1 st Edition, Issue 1, 57 pages, (Apr. 1994).

AGX 72 Fiber Outside Plant Panel, *ADC Telecommunications, Inc.*, 4 pages, (© 1991, 1995).

"FL2000 System, Second Edition," *ADC Telecommunications, Inc.*, Front and back cover, Table of Contents, pp. 1-40 (© 1994, 1995).

"Fiber Panel Products, Second Edition," *ADC Telecommunications, Inc.*, Front and back cover, Table of Contents, Index, pp. 1-111 (© 1994, 1996).

* cited by examiner

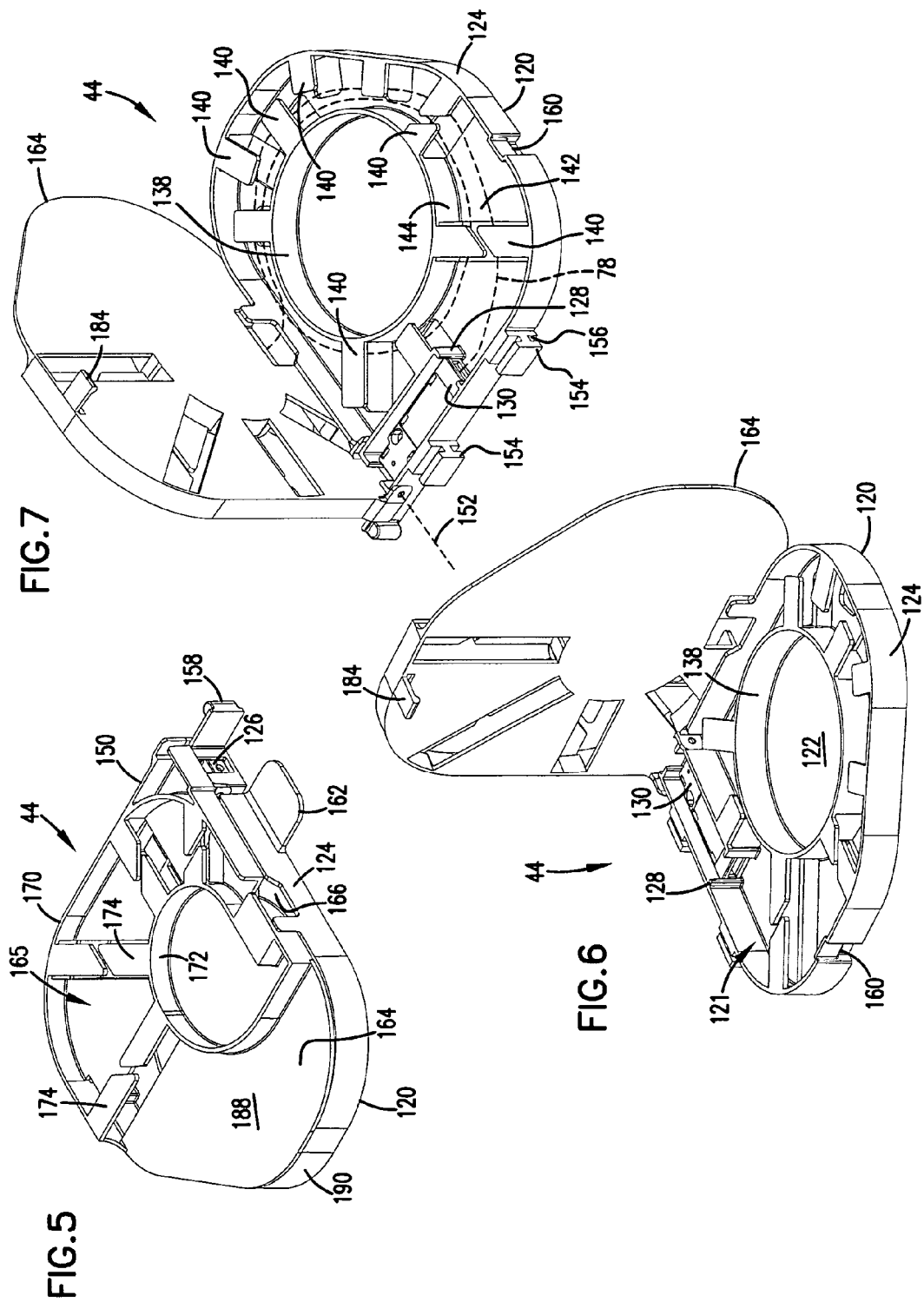

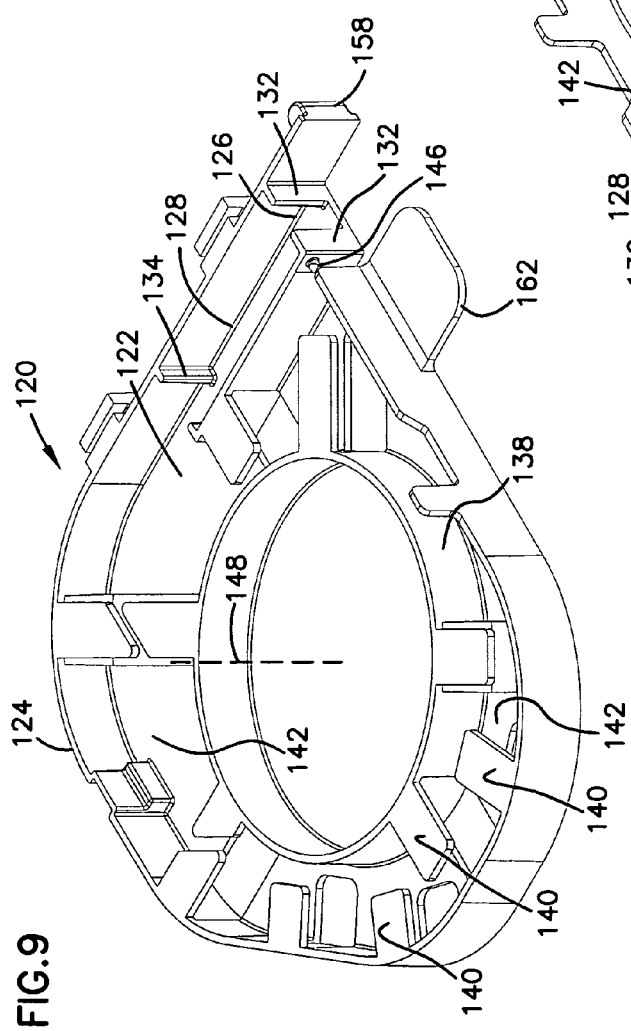
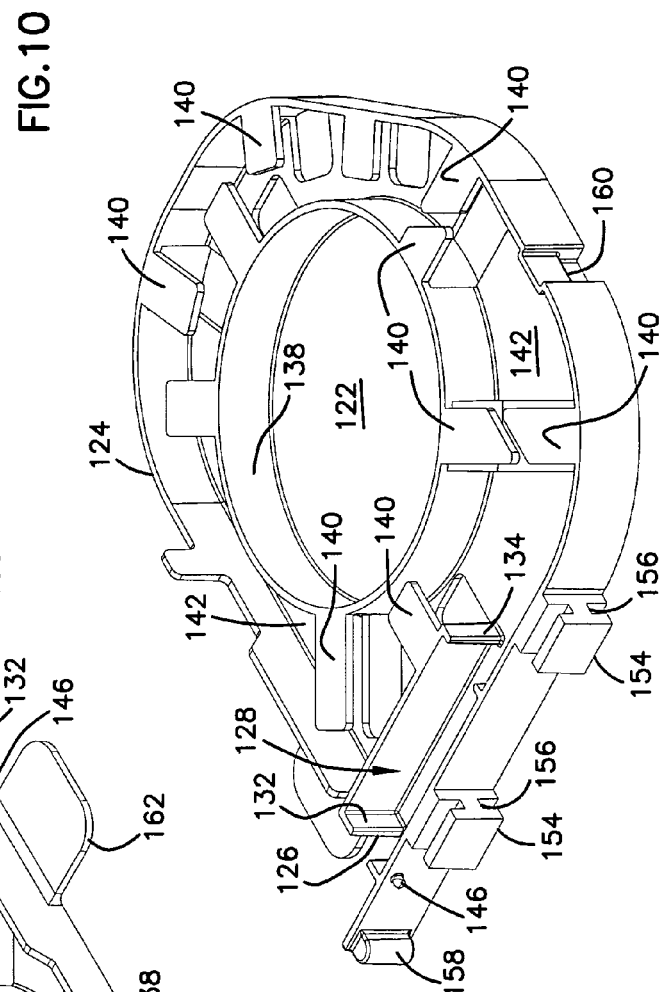

OPTICAL FIBER SLACK STORAGE TRAY FOR DISTRIBUTION CABINET

FIELD OF THE INVENTION

The present invention relates to apparatus and methods for termination and storage of optical fiber cables, such as distribution cables.

BACKGROUND OF THE INVENTION

With respect to termination and storage of optical fibers including distribution fibers, various concerns exist. One concern is providing high density to minimize needed space. In the case of outside plant enclosures, a reduced size for the enclosures and the internal structures is preferred.

A further concern related to termination and storage of optical fiber cables is the ease of access to the cables and the terminations. Such ease of use is desired during assembly, during installation in the field, and later when changes or modifications to the system are desired requiring adding or removing terminations, or when cleaning and checking the terminations.

A further concern in the area of termination and storage of optical fiber cables includes protecting the optical fiber from damage from excess bending below the minimum bend radius of the cable. Such protection of the fibers is desired during assembly and installation, and later when individual terminations and cables are accessed for cleaning or modification.

Further improvements in these areas are desired.

SUMMARY OF THE INVENTION

One aspect of the present invention relates to a cable storage tray including a base and a hinged cover. The base receives a loop of optical fiber cables between inner and outer walls. The optical fiber cables further communicate with a cable pathway on the cover with the optical fiber cables positioned between inner and outer walls of the cable pathway. The cable storage tray protects a slack length of cable. Cable retention tabs are preferably provided to retain the cables in the cable pathways.

A further aspect of the present invention relates to an apparatus and method including providing a plurality of slack storage trays mounted to a fixture. Each slack storage tray includes inner and outer walls extending from a bottom wall for holding multiple loops of optical fiber cables. The cables are wound around the inner wall about an axis perpendicular to the bottom wall. The fixture further includes a plurality of cable terminations in a cable termination area. The cable termination area is preferably defined by a plurality of rows of adapters. The rows are preferably slidable relative to the slack storage trays. Cables are terminated in the cable termination area. Slack associated with the cables is stored in the slack storage trays.

A method is provided wherein loops of cable slack are stored in a storage tray that allows the cable slack to be pulled from the storage tray at a selected time, and then later received by the storage tray when the slack is no longer needed. One preferred method includes providing a two level storage tray where a first portion of the slack is looped around a cable radius limiter on a first level of the tray, and a second portion of the slack is positioned around a cable radius limiter on a second level of the tray. The preferred method also includes providing a moveable cover to close access to the first level, and wherein the cover defines the cable radius limiter of the second level.

BRIEF DESCRIPTION OF THE DRAWINGS

FIG. 5 is a top perspective view of one of the cable storage trays.

FIG. 6 is a further perspective view of the cable storage tray of FIG. 5, with the cover in the pivoted open position.

FIG. 7 is a further perspective view of the cable storage tray shown in FIG. 6.

FIG. 9 is a perspective view of the base of the cable storage tray of FIG. 5.

FIG. 10 is a further perspective view of the base of FIG. 9.

DETAILED DESCRIPTION OF PREFERRED EMBODIMENTS

Figure 1:
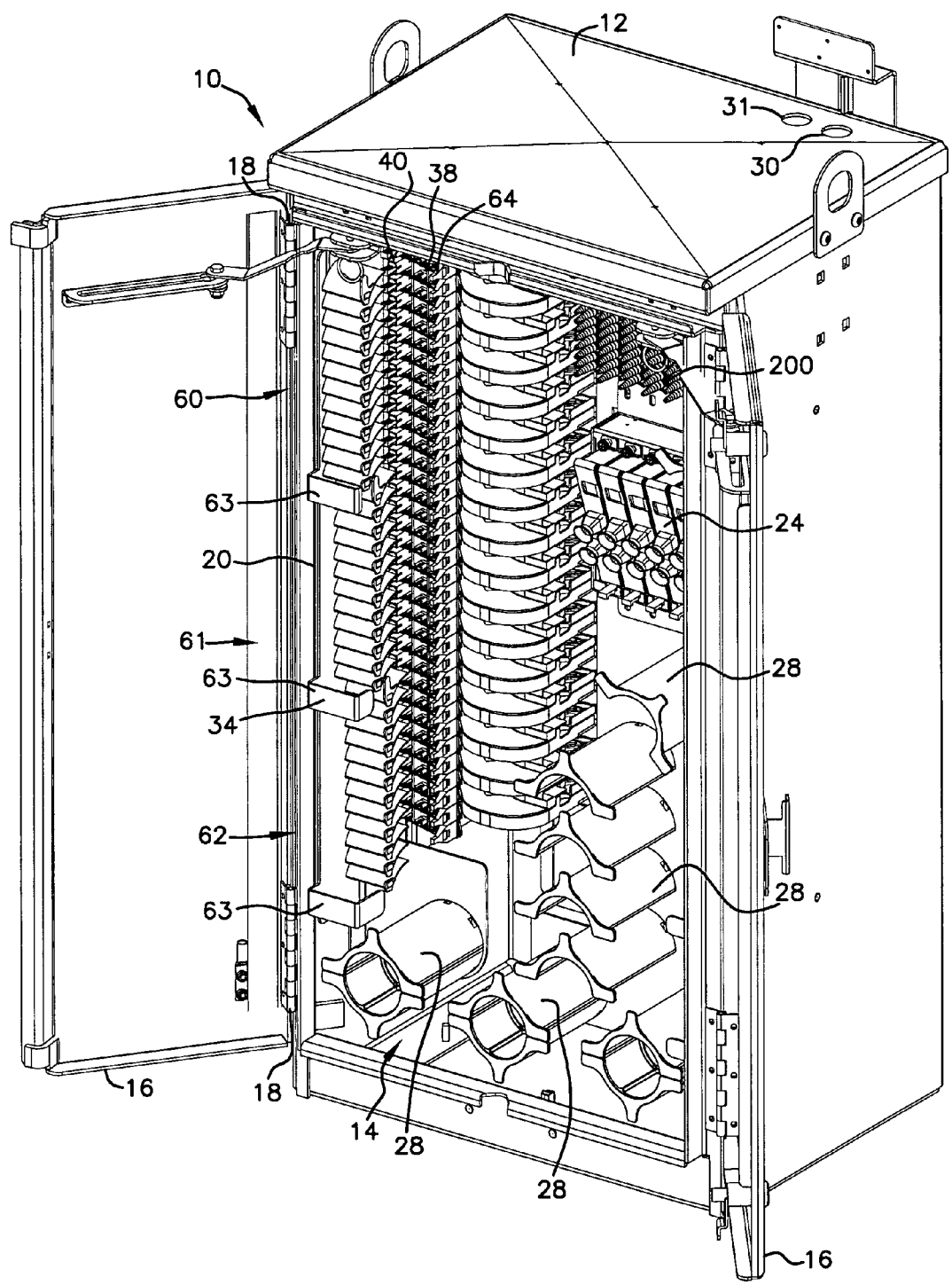
FIG. 1 is a front, top, right side perspective view of a fiber distribution cabinet in accordance with the present invention, including two front doors pivoted to the open position.

Referring now to FIGS. 1–4, one embodiment of an optical fiber distribution cabinet 10 is shown. Cabinet 10 may also be referred to as an enclosure 10, such as an outside plant enclosure. Enclosure 10 receives feeder cables and provides connection points for connecting to distribution cables to connect the feeder cables to equipment connected to the distribution cables. Enclosure 10 provides a secure and weather-resistant structure around the internal components.

Enclosure 10 includes a housing 12 defining an interior 14 for receiving the cabling and the terminations. Cables enter enclosure 10 at opening 30, and cables exit at opening 31. Pivoting doors 16 provide front access to housing 12 and are pivoted about hinges 18. Disposed within interior 14 is an enclosure subunit or fixture 20 including various cable management structures. Interior 14 also includes splitters 24 for splitting the feeder cable into individual cables. Vertical cable guides 26 and cable radius limiters 28 help manage the cabling.

The individual cables from splitters 24 are terminated in termination area 38, which includes a plurality of adapters 40. Cable manager 34 manages the individual cables (not shown) extending to a front side 38a of termination area 38. On a back side 38b of termination area 38 are a plurality of cables 78 defining the distribution cables (see FIG. 11). The distribution cables are managed by a fiber storage area 42 including a plurality of fiber storage trays 44.

Figure 3:
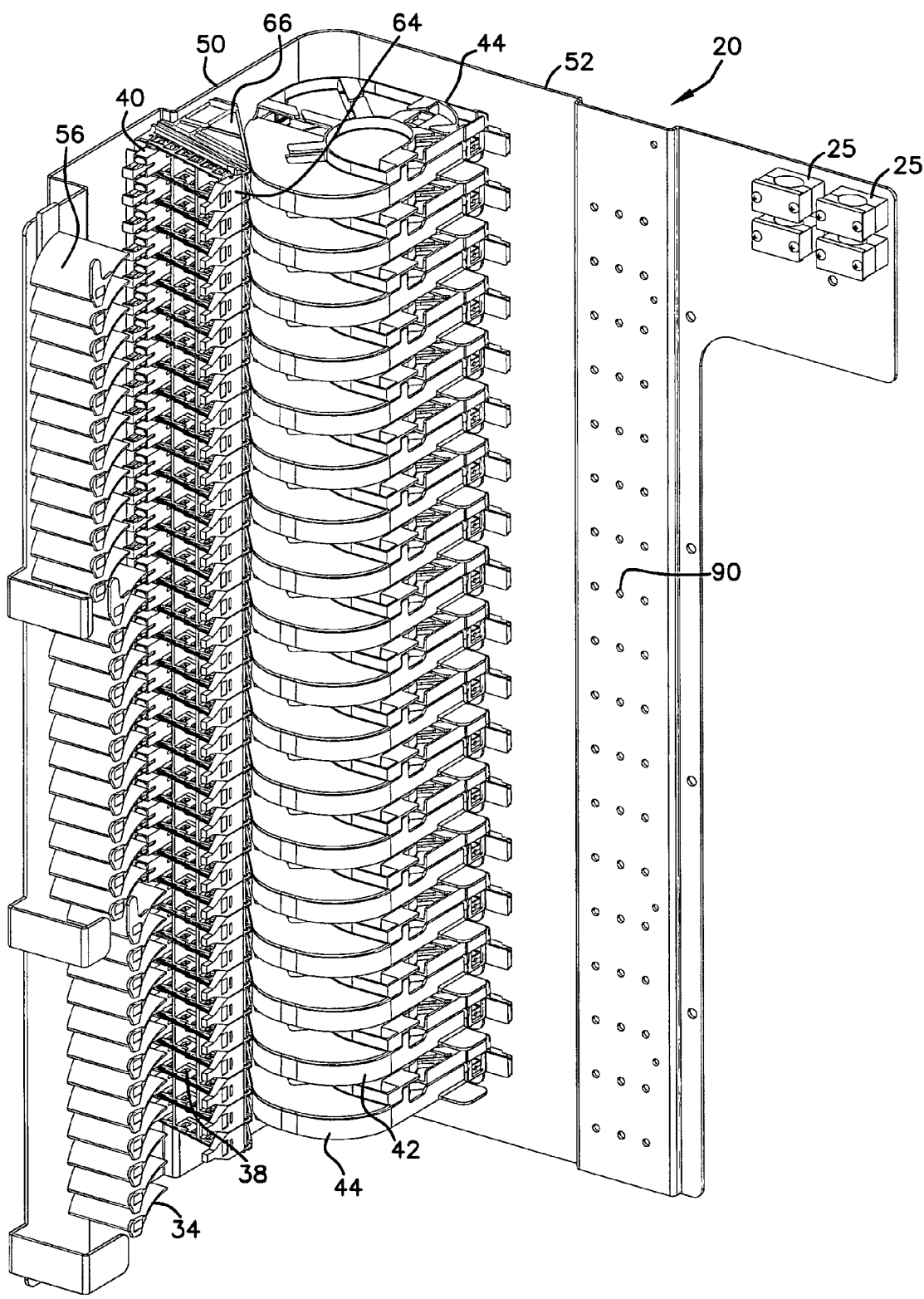
FIG. 3 is a front, top, right side perspective view of some of the interior components of the distribution cabinet of FIG. 1.
Figure 4:
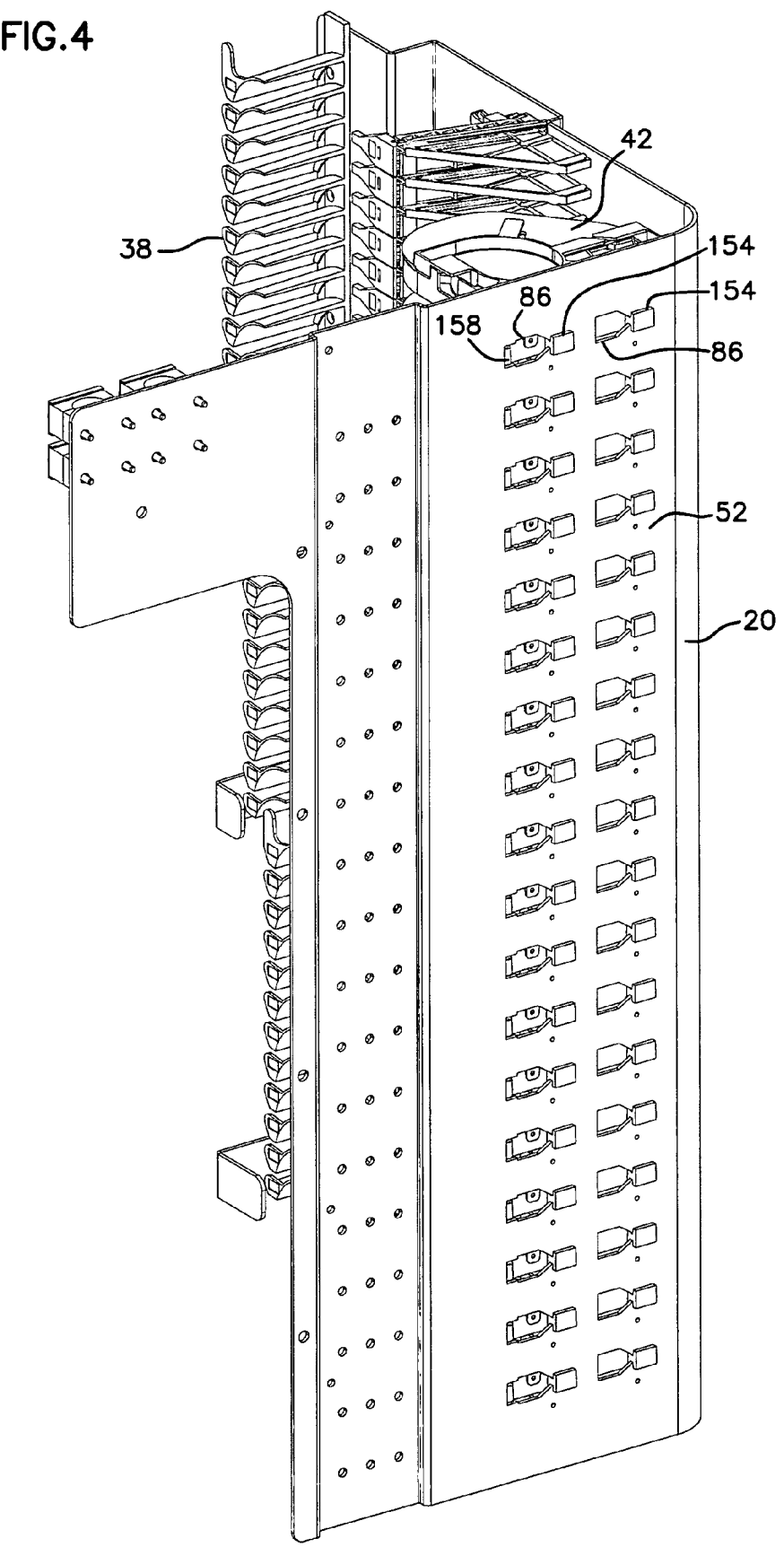
FIG. 4 is a rear, top, right side perspective view of the components shown in FIG. 3.
Figure 8:
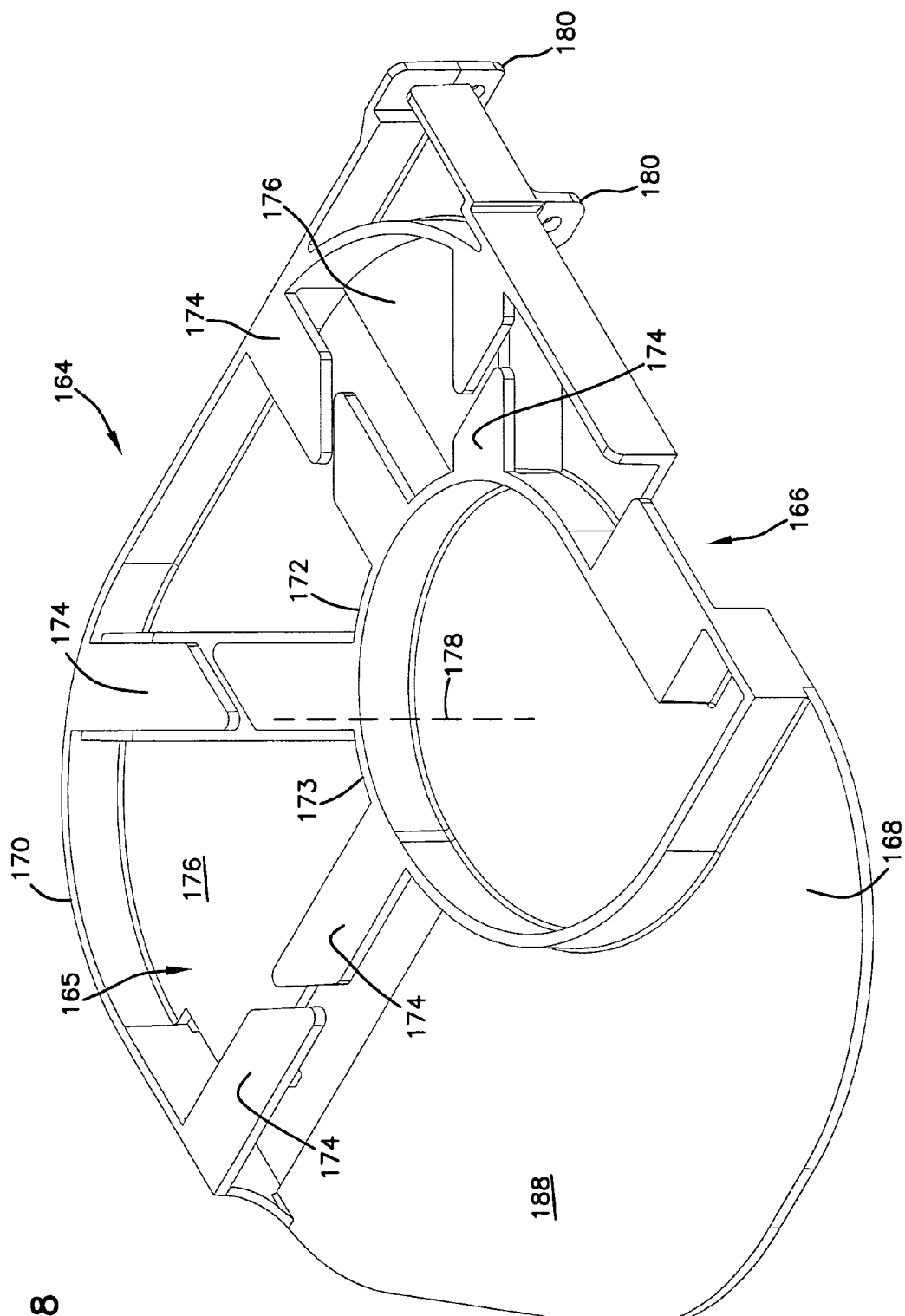
FIG. 8 is a perspective view of the cover of the cable storage tray of FIG. 5.
Figure 11:
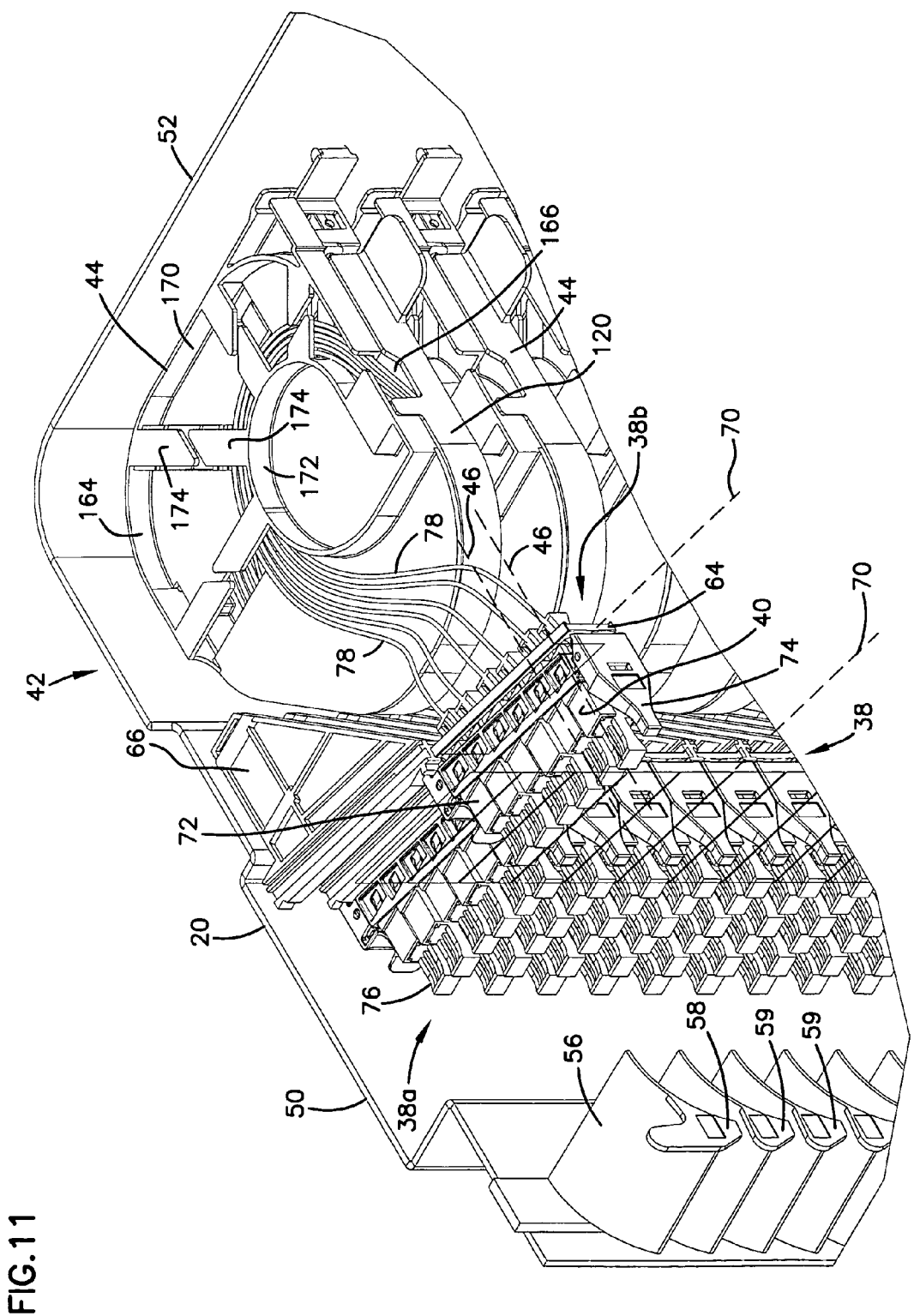
FIG. 11 is an enlarged view of a top portion of the cable storage and termination areas of the components shown in FIG. 3, including some cables, and further including one row of adapters moved into an access position.
Figure 12:
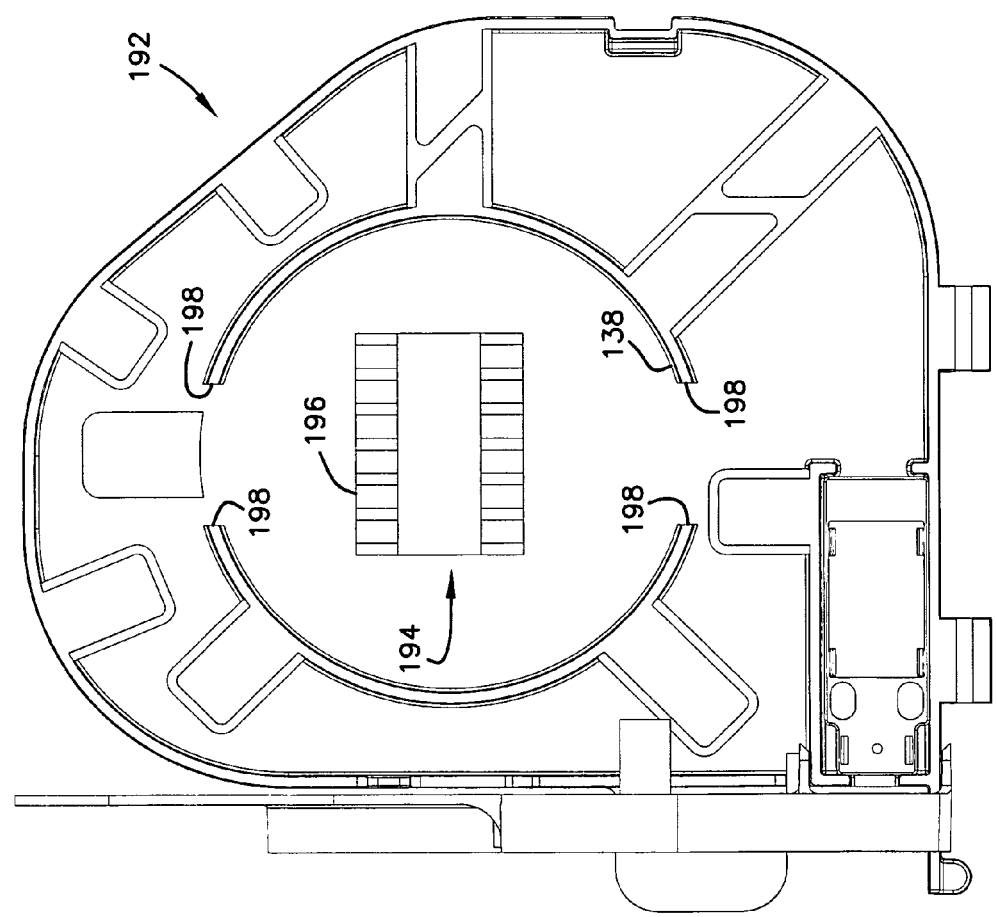
FIG. 12 is a top view of a modified base including cable splicing features.

Referring now specifically to FIGS. 3, 4, and 11, cable manager 34, termination area 38, and fiber storage area 42 are shown in greater detail. In the illustrated embodiment, cable manager 34 and termination area 38 are mounted to a side wall 50 of fixture 20. Fiber storage trays 44 are mounted to a back wall 52 of fixture 20, behind termination area 38.

Cable manager 34 includes a plurality of curved cable guides 56 for directing the cables in a downward direction from termination area 38. At an end of cable guide 56, one of cable retention fingers 58, 59 are provided. Cable manager 34 includes sections 60, 61, 62 with staggered guides 56. In section 60, guides 56 project outward the furthest from back wall 52. In section 62, guides 56 project the least. In section 61, guides 56 project an intermediate amount. Such a construction helps avoid too many cables in any vertical space. Outer bars 63 of cable manager 34 further help retain the cables extending to termination area 38.

Adapters 40 in termination area 38 are mounted on movable slides 64, which slide relative to mounting members 66. Mounting members 66 extend from side wall 50. Slides 64 are selectively movable along a longitudinal axis 70 so as to move a selected row 72 of adapters 40. In the moved position, each adapter 40 and the associated connecters are more easily accessible to a technician needing to connect or disconnect the cable and an adapter, or to clean one of the connecters. In the moved position, both the front and the back of each adapter 40 are more accessible. In FIG. 11, top slide 64 is moved to the access position. Lever 74 helps control movement of each slide 64. Slides 64 and mounting members 66 are described in greater detail in U.S. Pat. No. 6,591,051, the disclosure of which is incorporated herein by reference. In FIGS. 1–4, only one adapter 40 is shown in each slide 64. Five more adapters 40 fit into each slide 64 shown. Also, it is noted that axis 70 is disposed at angle not at 90 degrees relative to side wall 50. Slides 64 pull slightly toward a front of enclosure 10.

In the illustrated embodiment, slides 64 move horizontally along each longitudinal axis 70. Feeder cables (not shown), also referred to as splitter output cables, extend from splitters 24, through cable guides 26 and/or slack storage 28, to cable manger 34. From cable manager 34, the cables with end connectors mate with one of adapters 40 on front side 38a. Adapters 40 in the illustrated embodiment are shown with removable dust protector plugs 76 in each adapter.

Still referring to FIGS. 3 and 11, the distribution cables 78 extending from adapters 40 on slides 64 are managed by fiber storage trays 44. Each fiber storage tray 44 allows for management of slack associated with each cable 78. Such slack includes slack for manufacturing tolerances for cables 78. Fiber storage tray 44 also allows for management of additional slack, such as the slack needed to avoid excessive pulling on the cable when cable 78 and its terminating connector are removed from adapter 40 and cleaned by the technician. Further, slack may also be desirable to allow for ease of movement of slides 64. Fiber storage tray 44 manages the slack in an organized manner to avoid excessive pulling on cables 78 to prevent damage.

Now referring to FIGS. 5 through 10, fiber storage tray 44 includes a base 120 and a cover 164 hinged to base 120 along hinge axis 152. Cover 164 hinges for movement to an open position to allow access to a first side 121 of base 120. Cover 164 hinges closed to limit access to side 121, and help protect cables stored on base 120.

Base 120 includes a bottom wall 122, generally planar, with an upstanding outside wall 124. Upstanding outside wall 124 defines a cable entry location 126 for cables entering tray 44. Cable entry location 126 is located adjacent a side 46 of tray 44.

In the illustrated embodiment, adjacent cable entry location 126 is a fan out holder 128 for holding one or more cable fan outs 130. Fan outs 130 are held between end tabs 132 and 134 of base 120.

Base 120 further includes an inner radius 138 limiter defined by an inner wall 144 extending from bottom wall 122. Inner wall 144 defines a surface for looping the cables generally about an axis 148 perpendicular to bottom wall 122. Various cable retention tabs 140 project from upstanding outside wall 124 and inner wall 144 to further define a cable path 142. Cabling within tray 44 can be wound or looped one or more times around inner radius limiter 138. The cabling generally stays in position around inner radius limiter 138 within cable path 142 by retention tabs 140.

Base 120 includes hinge pins 146 for cooperating with hinge plates 180 of cover 164. When cover 164 is in the hinged open position as shown in FIGS. 6 and 7, the cabling can be positioned in cable path 142, or removed, if necessary. When cover 164 is placed in the closed position as shown in FIG. 5, the cabling is further secured within cable path 142 by cover 164. The cabling exits base 120 and communicates with features on a first side 165 of cover 164 by passing through a cable entry location 166. When cover 164 is closed, fan outs 130 are retained in base 120.

Cover 164 includes a bottom wall 168, generally planar. An upstanding outside wall 170 extends upward from bottom wall 168. An inner radius limiter 172 includes an upstanding inner wall 173. A cable path 176 is defined between upstanding outside wall 170 and inner wall 173. Cable retention tabs 174 extend from outside wall 170 and inner wall 173. Inner wall 173 defines a surface for wrapping the cables generally about an axis 178 perpendicular to bottom wall 168. Cable retention tabs 174 further help retain cabling extending from cable entry location 166 through cable path 176 to an exit location 188. Exit location 188 is generally at a front 190 of tray 44. From cable exit location 188, the cabling including the end connectors mate with adapters 40 on back side 38b of termination area 38.

Base 120 includes a latch groove 160 for receipt of a latch tab 184 of cover 164 to maintain the cover and base in the closed positions.

Base 120 includes projections 154 along a back 150 of tray 44 for mating with slots 86 in back wall 52 of fixture 20. Slots 86 narrow to fit into the necked regions 156 of projections 154 as trays 44 are slid to the left side of fixture 20. Spring arm 158 is biased against back wall and is also received in slot 86. To remove a tray 44, a gripping tab 162 is provided along a side of tray 44. Tray 44 is slid to the right in order to remove spring arm 158 from the received slot 86 and to position projections 154 in the wide portion in each of slots 86 in order to remove the tray from back wall 52.

During use of tray 44, cable 78 from fan out 130 is loosely wound around inner radius limiter 138 of base 120 (see dashed lines in FIG. 7) and passed through cable entry location 166. Cover 164 is closed retaining the cable and any fan outs 130 in a first compartment of tray 44. The cable is then positioned around inner radius limiter 172 of cover 164 around to exit 188. The cables 78 extend to adapters 40 at back side 38b of termination area 38. When the slack in cable 78 is pulled relative to storage tray 44, the inner radius limiters 138, 172 prevent cable 78 from going below the minimum bend radius. When the cable is pushed back into storage tray 44, the slack is contained by tray 44 including the outside walls 124, 170, cable retention tabs 140, 174 and cover 164 positioned over base 120. The other end of the cabling managed by tray 44 passes out through cable entry location 126, and can be tied at tie off locations 90 of fixture 20. Fan outs 130 allow for multiple individual fibers to be combined into a single jacketed cable. These jacketed cables can exit enclosure 10 at exit 31.

The adapters 40 are arranged in horizontal rows, with the connector axes 46 extending in a horizontal plane, generally coplanar with trays 44. In this manner, the loops of slack for each connector on back side 38b are managed and protected.

Referring now to FIG. 11, a modified tray base 192 includes a splicing area 194 including a splice holder 196. Inner radius limiter 138 includes gaps 198 for allowing cables to enter and have access to splice area 194.

The splitters 24 can be of conventional designs. The splitters 24 shown in the preferred embodiment are described in further detail in copending application Ser. No. 10/980,978, filed Nov. 3, 2004, entitled FIBER OPTIC MODULE AND SYSTEM INCLUDING REAR CONNECTORS, the disclosure of which is herby incorporated by reference. Other equipment besides splitters 24 can be used in cabinet 10, if desired. Cable clamps 25 on fixture 20 are used for clamping of the feeder cables extending toward splitters 24.

Figure 2:
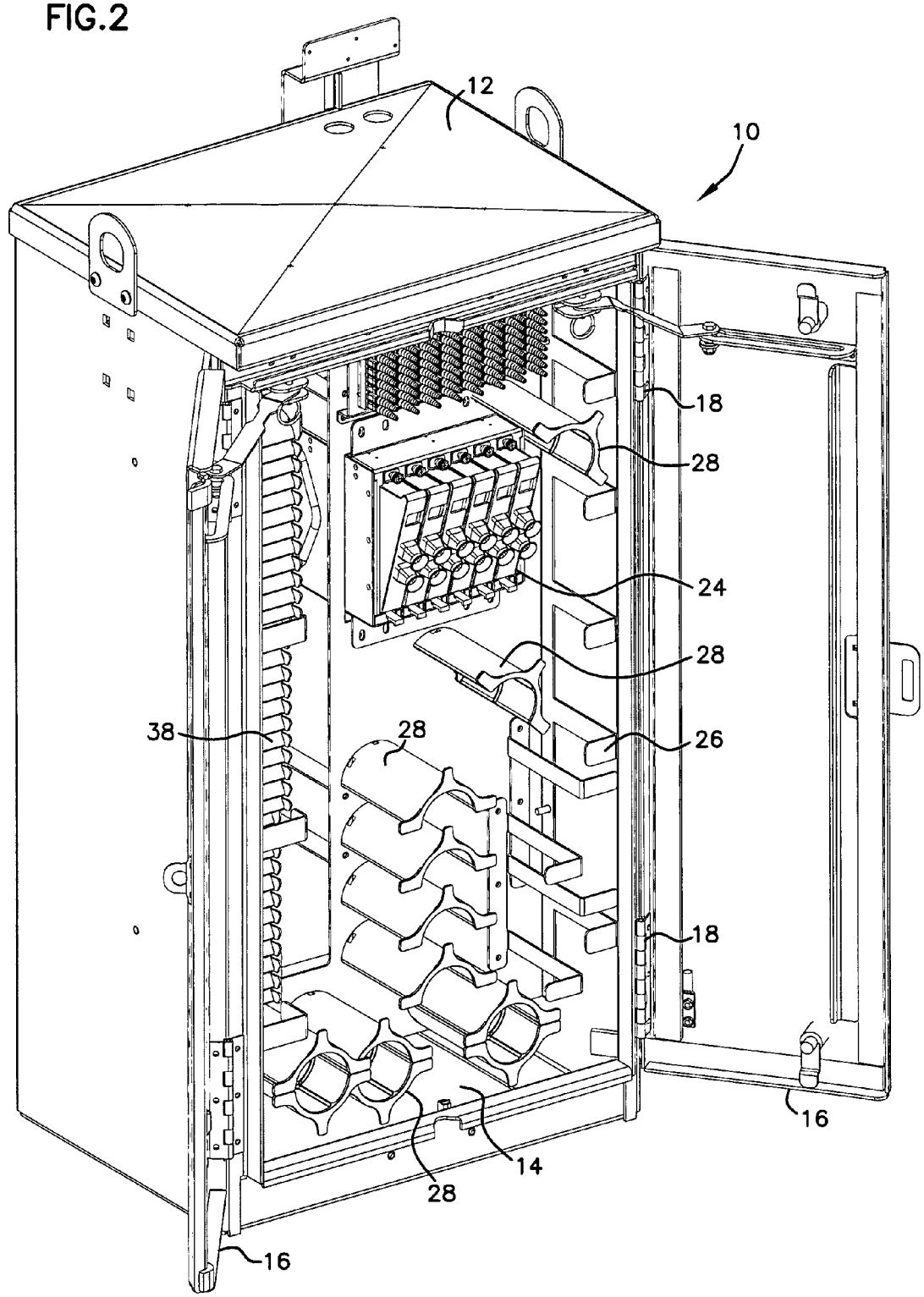
FIG. 2 is a front, top, left side perspective view of the distribution cabinet of FIG. 1.

In FIGS. 1 and 2, a connector storage area 200, or connector parking lot, is provided. The connector parking lot can be used to store the connectors and cables extending from splitters 24 until connection at front side 38a of termination area 38 is desired.

Various connector and adapter styles can be used. In the illustrated embodiment, SC type are shown. Other styles such as ST, FC, LX.5 (by ADC Telecommunications, Inc., such as in U.S. Pat. No. 6,142,676) and LC can be used.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A cable storage tray having a front, a rear, a first side, and a second side, the cable storage tray including:
   a) a base including:
      i) a bottom wall;
      ii) an upstanding outer wall extending from the bottom wall;
      iii) an upstanding inner wall disposed inside of the upstanding outer wall and extending upwardly from the bottom wall;
      iv) a plurality of cable retention tabs extending from at least one of the outer and inner walls;
      v) a cable entry location configured to enable at least one cable to enter the cable storage tray, the cable entry being defined through the upstanding outer wall of the base and along the first side between the front and the rear of the cable storage tray;
      wherein a cable path is defined between the inner and outer walls and the bottom wall and the cable retention tabs;
   b) a cover hinged to the base and including:
      i) a bottom wall;
      ii) a cable pass-through location defined through the bottom wall;
      iii) an upstanding outer wall extending from the bottom wall;
      iv) an upstanding inner wall disposed within the outer wall and extending upwardly from the bottom wall;
      v) a plurality of cable retentions tabs extending from at least one of the outer and inner walls;
      vi) a cable exit location for cables exiting from the cable storage tray, the cable exit location being defined in the upstanding outer wall and extending from the first side to the second side of the cable storage tray to define an open front of the cover;
      wherein a cable path is defined on the cover between the outer and inner walls and the bottom wall and the cable retention tabs of the cover.

2. The cable storage tray of claim 1, further comprising a latch for holding the base and the cover in a closed position.

3. The cable storage tray of claim 1, wherein the base includes mounting tabs on an opposite side of the tray extending from the base.

4. A method of storing telecommunications cables comprising:
   providing a storage tray;
   looping a cable around a first radius limiter within a first lower compartment of the storage tray;
   exiting the cable from the first lower compartment;
   looping the cable around a second radius limiter outside of the first lower compartment in a second upper compartment;
   pulling the cable from the storage tray at a cable exit to access a cable termination on the end of the cable, wherein the cable is in a first position around the second radius limiter when pulled;
   pushing the cable back into the storage tray after accessing the cable termination, wherein cable slack in the cable is created when the cable is pushed back, wherein the cable is in a second position around the second radius limiter when pushed, the second position being spaced further from the second radius limiter than the first position, wherein the second upper compartment has a lower support surface supporting the cable in the first position and in the second position at the cable exit.

5. The method of claim 4, further comprising:
   entering the cable into the storage tray through a cable entry location defined by the first compartment.

6. The method of claim 4, wherein looping the cable around the first radius limiter comprises wrapping the cable in at least one complete loop about the first radius limiter.

7. The method of claim 4, wherein exiting the second end of the cable from the first compartment comprises entering the second end of the cable into a second compartment.

8. The method of claim 7, wherein exiting the second end of the cable from the cable storage tray comprises exiting the second end of the cable through a cable exit location defined in the second compartment.

9. A cable storage tray comprising:
   a base including:
      i) a bottom wall;
      ii) an upstanding outer wall extending around the bottom wall, the upstanding outer wall defining a cable entry location sized to enable at least one cable to pass through the outer wall and into the base;
      iii) a fanout holder located adjacent the cable entry location, the fanout holder configured to receive a ribbon cable and to separate the ribbon cable into separate cables;
      iv) an upstanding inner wall disposed inside of the upstanding outer wall;
      v) a cable path defined by the upstanding outer wall, the upstanding inner wall, and the bottom wall, the cable path being configured to enable a cable to wrap in at least one complete loop around the upstanding inner wall; and b) a cover hingedly mounted to the base, the cover including:
   i) a bottom wall;
   ii) an upstanding inner wall extending from the bottom wall of the cover;
   iii) an upstanding outer wall extending from the bottom wall of the cover, the outer wall of the cover defining a cable exit location configured to enable at least one cable to pass through the outer wall of the cover and to exit from the cable storage tray;
   iv) a cable path defined between the outer wall, the inner wall, and the bottom wall, the cable path being configured to guide a cable out from the storage tray before wrapping around the upstanding inner wall of the cover in a complete loop;
   v) the cable exit location being defined in the upstanding outer wall and extending from a first side to a second side of the cable storage tray to define an open front of the cover.

10. The cable storage tray of claim 9, wherein the bottom wall of the cover has a first side and an opposite, second side, the second side facing the bottom wall of the base, the bottom wall of the cover defining a cable entry location sized to enable at least one cable to pass through the bottom wall of the cover from the cable path of the base to the first side of the cover.

11. The cable storage tray of claim 9, further comprising:
a cable entering the cable storage tray through the cable entry location in the outer wall of the base, the cable extending through the cable path of the base and wrapping in at least one complete loop about the inner wall of the base, the cable further extending through the cable pass-through location in the bottom wall of the cover, and extending through the cable path of the cover, and exiting the cable storage tray through the cable exit location in the outer wall of the cover.

12. The cable storage tray of claim 9, wherein a portion of the bottom wall of the cover has a perimeter and wherein the outer wall of the cover does not extend around at least a portion of the perimeter, the cable exit location of the cover defined at the portion of the perimeter of the bottom wall of the cover.

13. The cable storage tray of claim 9, wherein the inner wall of the base forms a closed wall.

14. The cable storage tray of claim 9, wherein the inner wall of the base is substantially circular.

15. The cable storage tray of claim 9, further comprising a plurality of cable retention tabs extending from at least one of the upstanding outer wall and the upstanding inner wall of the cover.

16. The cable storage tray of claim 15, further comprising a cable fanout.

17. The cable storage tray of claim 9, wherein the cable exit location is sufficiently wide to enable the cables to shift over the bottom wall of the cover without bending significantly.

* * * * *